June 1, 1965   W. SCHICK   3,187,242
STACKED ELECTRICAL CAPACITORS
Filed Oct. 2, 1961
FIG.1.
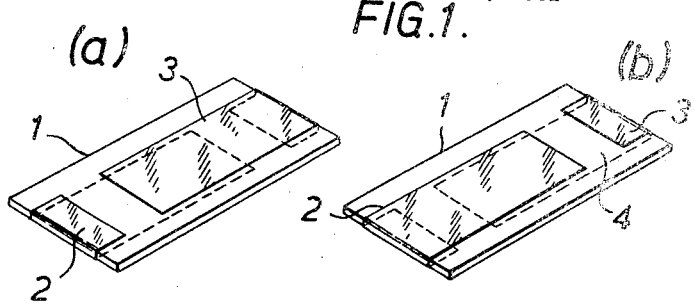
FIG.3.
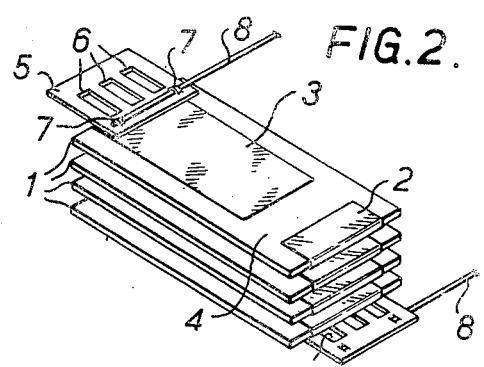
FIG.2.
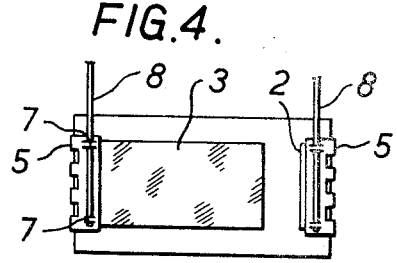
FIG.4.
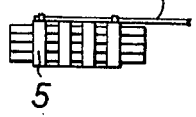
FIG.5.
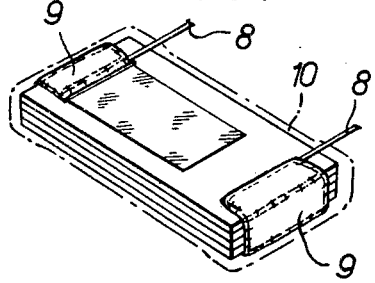
FIG.6.
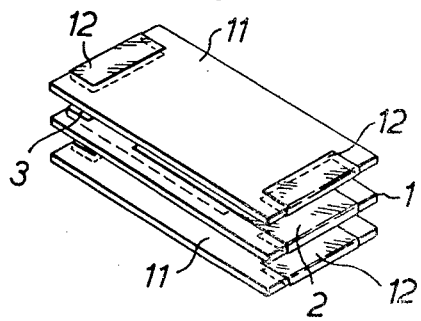
FIG.7.
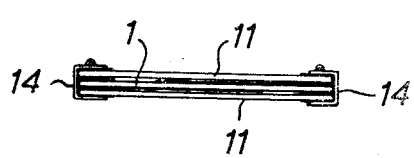
FIG.8.
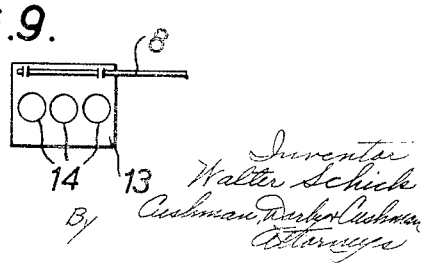
FIG.9.
Inventor
Walter Schick
By Cushman, Darby & Cushman
Attorneys

United States Patent Office 3,187,242
Patented June 1, 1965

3,187,242
STACKED ELECTRICAL CAPACITORS
Walter Schick, 90 Manor Road, Chigwell, England
Filed Oct. 2, 1961, Ser. No. 142,091
Claims priority, application Great Britain, Oct. 7, 1960,
34,485/60
5 Claims. (Cl. 317—261)

This invention relates to electric capacitors of metallised type and to the manufacture thereof. Reference to "metallised type" capacitors denotes capacitors in which the electrodes are formed by metallised coatings on a dielectric plate or plates, such electrodes being hereafter referred to as "metallised electrodes."

The manufacture of silvered-mica and other metallised type capacitors involves problems in establishing good electrical contact between paralleled metallised electrodes and/or between metallised electrodes and the lead-in wire or other terminals. More particularly, difficulties arise due to the weakness of the metallised electrodes on the edges of the dielectric plates. Some capacitors embody mica or other dielectric plates of only a few mils or even one mil in thickness and the application of solder to the silvered coatings at the plate edges is liable to dissolve the coatings at these edges so that the electrical properties are seriously impaired. It has been proposed to reinforce the silvered coatings at the plate edges with a silver paste and to fire this coating preparatory to the application of solder but even in that case it is desirable to employ solder with an appreciable silver content to reduce the risk of seriously damaging the electrode edges. The use of such special solder and the necessity to fire the assembly under pressure in the course of manufacture makes this known method of manufacture time consuming and costly.

It is an object of the present invention to provide an improved method of making electrical capacitors wherein edge bonding of metallised electrodes is achieved by a simple soldering operation without necessity for preliminary reinforcing operations and firing.

A further object of the invention is to enable edge bonding of metallised electrodes in capacitor construction to be performed using an inexpensive solder.

A further object of the invention is to realise the edge bonding of metallised electrodes by dip-soldering the electrode edges while electrically conductive members are held against the capacitor, and against or contiguous with said electrode edges, so that said members become soldered to the electrodes.

Other objects and advantages of the invention will become apparent from the following detailed description of particular embodiments of the invention which have been selected merely by way of example.

Referring to the drawings:

FIG. 1 comprises perspective views (FIGS. 1a and 1b) of the opposite sides of a single metallised dielectric capacitor plate, FIG. 2 is an exploded view of the component parts of a capacitor, FIG. 3 is a side elevation of the component parts assembled for bonding, FIG. 4 is a plan view of the assembly shown in FIG. 3, FIG. 5 is an end view of the assembly shown in FIG. 3, FIG. 6 is a perspective view of the assembly shown in FIG. 3 after bonding has taken place, FIG. 7 is an exploded view of component parts of another capacitor according to the invention, FIG. 8 is a side view of the parts shown in FIG. 7 assembled together with end members preparatory to bonding, FIG. 9 is a plan view of one of the end members used in the capacitor shown in FIGS. 7 and 8.

Referring firstly to the capacitor which is the subject of FIGS. 1 to 6, the capacitor comprises four silvered-mica plates each of which is as shown in FIG. 1. The mica plate 1 is about 0.0015 inch thick and bears two silvered coating layers 2, 3 separated by insulating gaps 4 which are offset one with respect to the other along the length of the plate. The width of the silvered coating layers is somewhat less than the width of the mica plate. Four of these silvered plates are brought together so that the edge silverings exposed at one end of the stack appertain to coatings which are electrically insulated by the gaps 4 from the silvered layers exposed at the other end of the stack.

In the bonding of the stack, two apertured end pieces 5 are employed. Each end piece is of thin gauge copper or brass (about 0.015 inch thick) and has three rectangular apertures 6 formed therein and the metal of the end piece is slitted at two positions to define strips 7 which are raised to form loops through which lead-in wires 8 are passed. The end pieces are designed to be folded about the opposed silvered edges of the stack of plates as shown in FIGS. 3 to 5 inclusive so that the silvered edges of the plates are partly masked by the end pieces, being only exposed through the slots 6. With this objective in view the length of the slots 6 is a little greater than the overall thickness of the stack composed of the four silvered-mica plates, and the width of the end pieces measured normally to the length of the slots, is slightly greater than the width of the silvered coatings on the mica plates. The width of the individual slots is about 0.03″.

The end pieces are folded about the stack as shown in FIGS. 3 to 5. In this instance the end pieces are sufficiently rigid to serve as temporary clamps so that they hold the stack assembled on completion of the folding. The folding of the end pieces may be performed or at least completed by a suitable tool. Each end of the stack is then dipped in molten eutectic tin/lead solder to form a solder deposit 9 as shown in FIG. 6. The molten solder reaches the silvered edges of the mica plates in small quantities through the slots 6 and solidly unites the electrode layers to each other and to the end pieces, there being no apparent removal of silvered coatings by the solder even though an inexpensive solder without any silver content is used. The use of a eutectic tin/lead solder is preferred since it is capable of penetrating very well through the narrow slots 6 in the end pieces.

It is not essential to use end pieces with apertures as small as in the embodiment according to FIGS. 1 to 6. Good (although not optimum) results are obtainable by using end pieces with a single large aperture, or even by using an unapertured end piece arranged so as to cover a part only of the exposed electrode edge or edges.

Experiment with an end piece having a single large aperture instead of a number of small apertures as in the illustrated embodiment shows that while there may be some degree of solution of silver edge coatings in the solder in the central region of the aperture, the coatings are not damaged or destroyed adjacent the aperture edges. While the invention is not dependent on any theory of the action which takes place it is believed that capillary attraction or surface tension plays a part in the application of solder to the electrode edges. Thus it is thought that in the case of an end piece with a large aperture, molten solder in the region of the aperture moves along these edges onto the metallised electrode edges under surface tension, immediately wets the electrode edges and remains in a substantially static condition until solidification takes place. In the central region of the aperture the molten solder is more subject to movement in the dipping process and this may account for the dissolving of coatings in this region.

It is therefore to be understood that the precise form of the electrically conductive members (the so-called "end pieces") which are associated with the electrode edges for the soldering operation in making a capacitor according to the invention is not critical. It is sufficient to ensure that the end piece provides at least one edge or face contiguous with the electrode layers to be soldered so that in the dipping operation molten solder flowing along the said edge or face will encounter the electrode layers and unite them with the end piece. Thus, as already mentioned, it is possible to use as an end piece an unapertured piece of sheet metal or metal foil disposed so that it extends partly over the metallised electrode edges to be soldered. I prefer however to use end pieces which provide one or more small openings, e.g., slots or holes, say not more than 0.05" wide. As compared with the situation when there is a large opening for the solder, this affords the advantage that there is less tendency for the molten solder in the opening or openings to move relatively to the electrode edges. The use of a plurality of such small openings rather than a single large opening moreover has the advantage that for a given exposed area of metallised electrode edges there is a greater aggregate edge length on the end piece where good bonding of the electrodes can take place. For optimum results in making capacitors according to the invention the end pieces should provide a plurality of openings of capillary size or near capillary size since the solder is applied to the electrode edges at a number of local regions in small quantities and substantially the whole of the molten solder lying against the electrodes in the dipping operation is in a static condition or substantially so. Such small or capillary size openings may be provided by using end pieces with small apertures therein as in the embodiment illustrated in FIGS. 1 to 6 or by using at each end of the capacitor two or more unapertured end pieces spaced apart to define a narrow gap or gaps for the access of solder to the electrodes.

In the embodiment according to FIGS. 1 to 6, the assembly of silvered-mica plates and end pieces is immersed in molten solder at each end sufficiently far to cause molten solder to reach the portions of the lead-in wires which are held against the end pieces so that the lead-in wires are simultaneously soldered in place. The projecting portions of the wires are bent during the soldering operation to keep them clear of the solder. Instead of permanently connecting the lead-in wires to the end pieces during the soldering of the electrode ends, the lead-in wires may be permanently connected to the end pieces in a separate operation before or after the dip soldering of the stack.

In order to ensure that the capacitor plates are held firmly together by the end pieces for the soldering operation it is preferred at least to complete the folding of the end pieces by means of a suitable tool. Any suitable gripping tool can be used for this purpose. It is not essential however in all embodiments of the invention for the end pieces to serve as temporary clamps. For example the end pieces can be very thin metal sheet or foil of insufficient rigidity in itself to hold the capacitor plates firmly together. In that case the assembly may be held clamped by a suitable tool during soldering. The end pieces need not extend onto the faces of the capacitor body adjoining the end faces to which the electrodes extend.

After the soldering of the stack ends and the permanent connection of the lead-in wires to the stack, the bonded stack of silvered-mica plates is dried and impregnated according to normal practice in capacitor manufacture with a micro-crystalline hydrocarbon wax such as is commonly supplied to the industry by Standard Oil of New Jersey and by other manufacturers, and likewise in accordance with known and usual practice the bonded stack is finally dipped into a thermosetting or thermoplastic compound which comprises a filler such as calcium carbonate and a resin such as an epoxy or phenol formaldehyde resin thereby to form a moisture-proof casing 10. In the actual embodiment which is the subject of FIGS. 1 to 6, the following coating composition was used: 80% by weight phenolic resin sold as "Durez" No. 9841 by Hooker Chemical Corporation, New York, and 20% by weight of ethyl alcohol. As an alternative to dip coating the assembly, the resin coating may be moulded.

I would emphasise that the actual construction of capacitors illustrated in the drawings and now being described are merely examples and many variations of construction are possible. As one modification to the construction illustrated by FIGS. 1 to 6. the lead-in wires could be arranged to project axially in opposite directions from the stack, the wires being held in loops of the end pieces running parallel with the silvered edges of the mica plates.

Referring now to FIGS. 7 to 9 the capacitor here illustrated comprises only one silvered-mica plate. This plate is identical with the plates used in the capacitor according to FIGS. 1 to 6 and its different parts are designated by the same reference numerals. For imparting the requisite rigidity to the unit, this single silvered-mica plate is placed between two thicker mica plates 11 (about 0.004 inch thick) the ends of which are silvered at 12 to make electrical contact with the silvered coatings on the centre mica plate. The ends of the three-plate assembly are then wrapped with two identical copper end pieces 13 (gauge 0.015") one of which is shown in FIG. 9. This end piece has three circular holes 14 therein each with a diameter (about .02–.03 inch) slightly greater than the overall thickness of the stack of three plates. A lead-in wire 8 is held in loops of the end piece in the same way as the lead-in wires of the previously described capacitor (FIGS. 1 to 6). The end pieces are pressed firmly in position so that they tightly clamp the plate assembly and the ends of the assembly are then dip soldered in precisely the same way as in the manufacture of the capacitor according to FIGS. 1 to 6. The completion of manufacture also proceeds exactly as in the case of the first described embodiment, viz. the bonded stack is dried and impregnated and finally encased in resin.

The provision of the edge silverings 12 on the stiffening plates improved the anchorage of the end pieces to the stack. These edge silverings on the stiffening plates are not however absolutely essential and they can be omitted.

The illustrated embodiments of the invention use silvered-mica plates but alternative forms of plate may be used in carrying out the invention. A capacitor according to the invention may incorporate any desired number of plates or foils. In general, dielectric plates or foils of a thickness between 0.0012" and 0.003" will be used.

The invention includes methods of manufacturing capacitors with the new features herein referred to.

Although preferred embodiments have been described and various modifications have been referred to it will be understood that many alternative forms of capacitors may be constructed within the true spirit and scope of the invention as ascertained by the appended claims.

I have used the term "end pieces" in this specification to denote the conductive members which are associated with the electrode edges and soldered thereto in the operation of soldering paralleled electrodes together and/or of soldering electrodes to the capacitor terminals. The thickness of the end pieces is not critical. End pieces much thicker than those according to the illustrated embodiments and thus providing a thicker boundary edge face or faces contiguous with the metallised electrode edges, may be used. The term "end piece" is not to be taken as implying that the invention is only concerned with capacitors of a particular shaping.

What I claim is:

1. An electric capacitor comprising a dielectric plate bearing metallised coatings forming electrodes, said metallised coatings extending over opposed edges of said plate, stiffening plates located one on each side of said dielectric plate to form a three-plate stack and having metallised coatings making electrical contact with the metallised coatings forming said electrodes, at least one piece of sheet metal lying directly against the metallised coatings at each end of said stack, each sheet metal piece defining at least one opening across which said metallised edge coatings at the corresponding end of the stack extend, and solder deposits at said opposed stack ends, said solder extending into said openings so as to unite the metallised coatings of the three plates and to bond said sheet metal pieces to the stack.

2. An electric capacitor comprising a plurality of plates bonded together as a stack, at least one such plate being a dielectric plate with metallised coatings thereon forming electrodes, said metallised coatings extending over opposed edges of said dielectric plate, end pieces of apertured metal foil wrapped around opposed ends of said stack so as to lie in contact with but only partly to cover said edge coatings, solder reinforcement on said edge coatings uniting said end pieces with said edge coatings, terminals bonded to said end pieces, and a moisture-proof casing enveloping said stack and leaving only portions of said terminals projecting.

3. An electric capacitor comprising a plurality of dielectric layers having metallised coatings which form electrodes and extend onto edges of such layers metal foil, end pieces separated one from the other and folded about said plurality of layers so that each said end piece lies in direct contact with metallised coatings on edges of said layers, at least one opening of capillary size located in each said end piece so that said contacting edge coatings extend across such openings, and solder deposit extending onto the edge coatings through said openings and uniting said end pieces directly to said edge coatings.

4. An electric capacitor according to claim 3 wherein each said end piece has at least one opening in the form of a slot with its longer dimension running normal to the planes of said layers, said slot having a width of less than 0.5 inches.

5. An electric capacitor comprising a plurality of thin dielectric layers each having metallised coatings which form electrodes and extend onto opposed edges of said layers, said layers being stacked with said electrodes of adjacent layers in contact, pieces of sheet metal folded about opposed ends of said stack in direct contact with but only partly covering said metallised edges thereby to provide at least one sheet metal boundary edge contiguous with said metallised edges at each end of the stack, solder reinforcement on said edge coatings at said opposed ends of the stack uniting said edge coatings of different layers to each other and to said end pieces, and terminals connected to said end pieces.

References Cited by the Examiner
UNITED STATES PATENTS

| | | | |
|---|---|---|---|
| 1,900,352 | 3/33 | Lewis | 29—503 |
| 2,224,288 | 12/40 | Chapman | 317—261 |
| 2,389,018 | 11/45 | Ballard | 317—261 |
| 2,673,972 | 3/54 | Minnium | 317—242 |
| 2,736,080 | 2/56 | Walker et al. | 317—242 |

LARAMIE E. ASKIN, *Primary Examiner.*

JOHN F. BURNS, *Examiner.*